Feb. 4, 1936.  D. F. NEWMAN  2,029,938
PROJECTION APPARATUS
Filed July 21, 1934  2 Sheets-Sheet 1
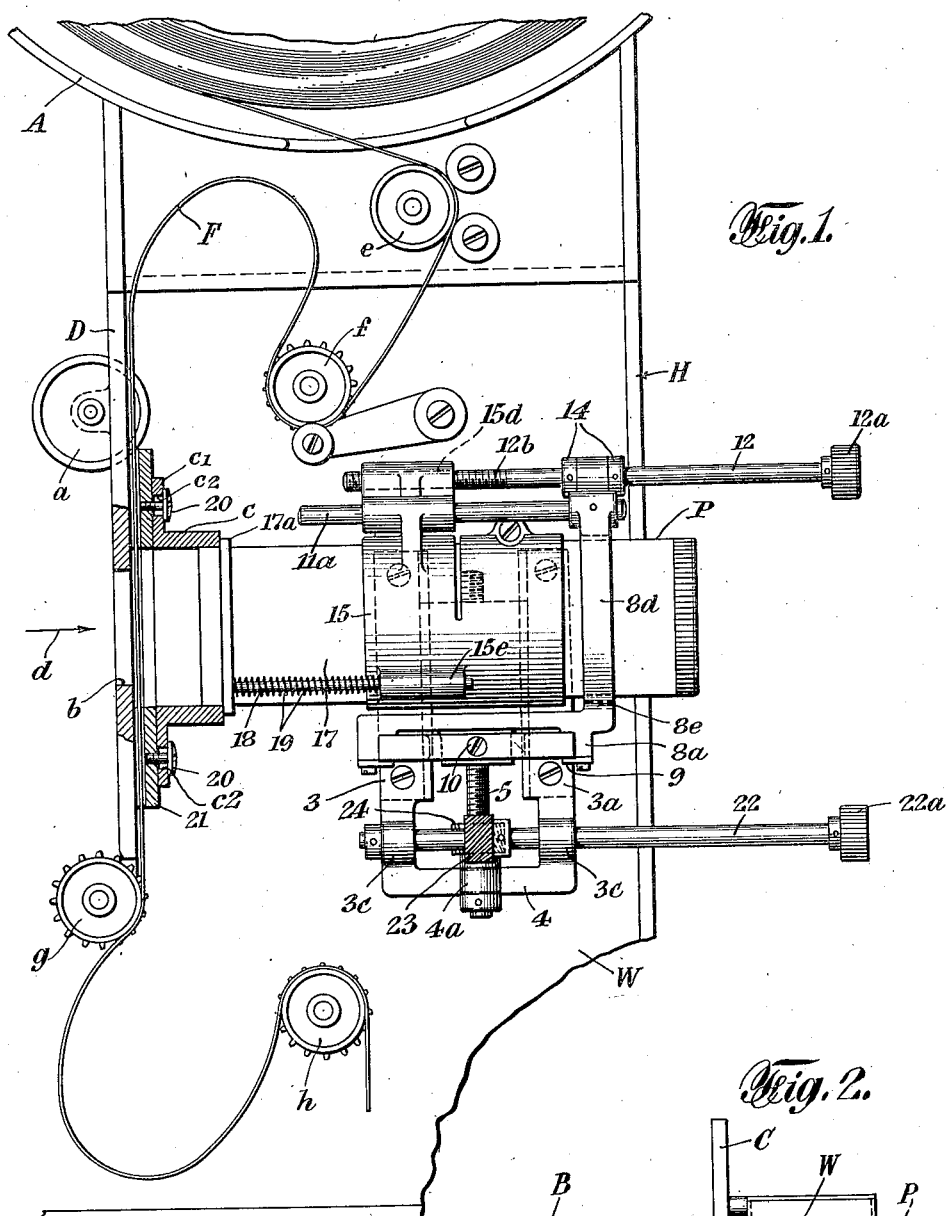
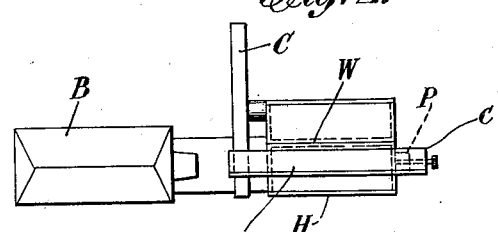
INVENTOR
David F. Newman
BY
Ward, Crosby & Neal
ATTORNEYS

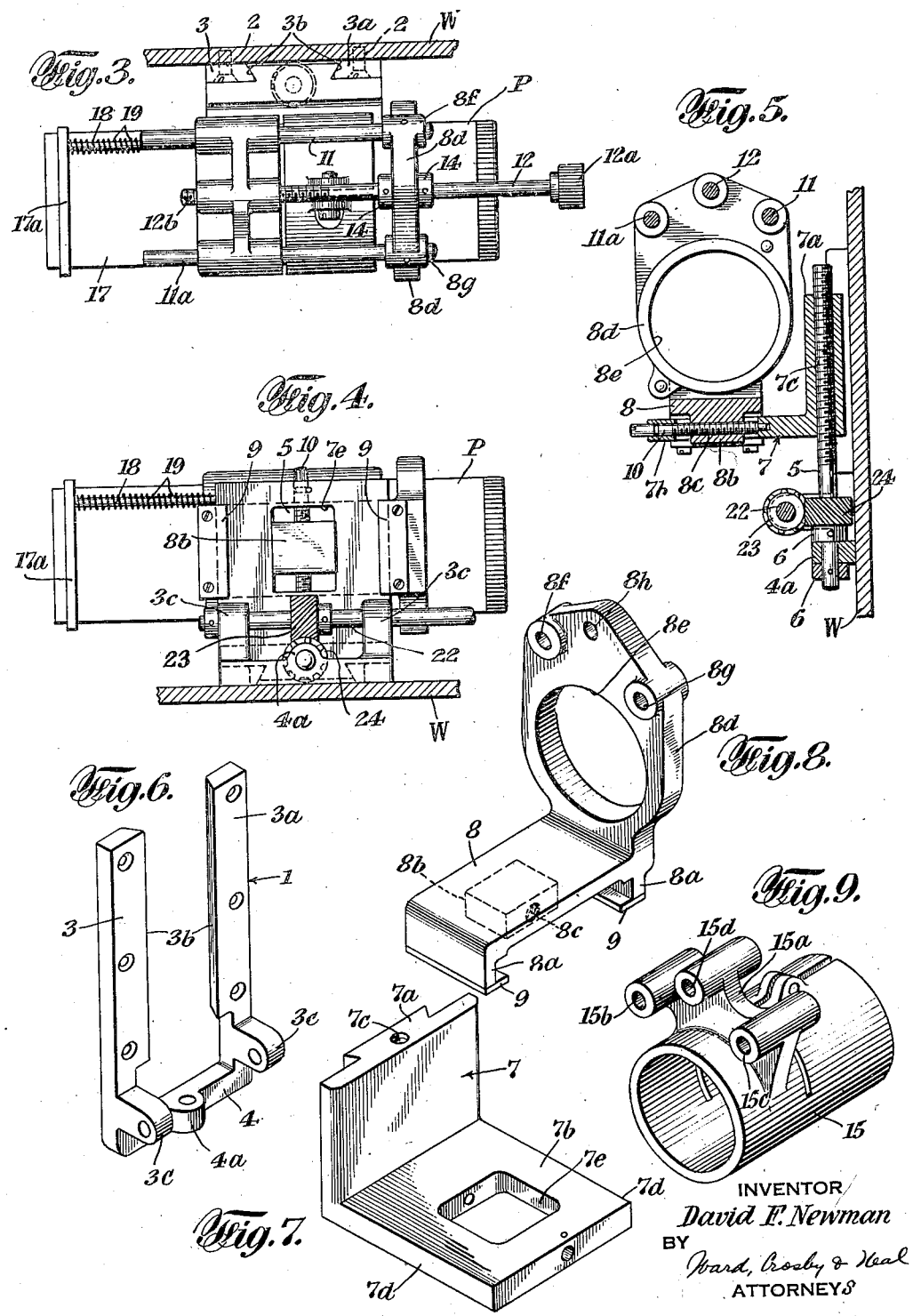

Patented Feb. 4, 1936

2,029,938

UNITED STATES PATENT OFFICE 2,029,938

PROJECTION APPARATUS

David F. Newman, Rockville Centre, N. Y., assignor to Trans-Lux Daylight Picture Screen Corporation, New York, N. Y., a corporation of Delaware Application July 21, 1934, Serial No. 736,300

11 Claims. (Cl. 88—24)

My invention relates to projection apparatus of the type utilizable for projection of motion pictures.

My invention has particular reference to an improved projection apparatus embodying novel features of construction for obtaining selective adjustments of the projection lens.

Further advantages, characteristics and features of my invention will become apparent from the following detailed description.

My invention resides in the projection apparatus, combinations and arrangements of the character hereinafter described and claimed.

For an understanding of my invention and for an illustration of one of the forms thereof, reference is to be had to the accompanying drawings, in which:

Figure 1 is an elevational view, partly in section, of a projector mechanism as constructed in accordance with my invention;

Fig. 2 is a diagrammatic plan view of a projector mechanism;

Fig. 3 is a plan view, partly in section, of a supporting arrangement for a projection lens;

Fig. 4 is a bottom view of the arrangement shown in Fig. 3;

Fig. 5 is a transverse, vertical sectional view, partly in elevation, of apparatus as constructed in accordance with my invention; and Figs. 6, 7, 8 and 9 are perspective views illustrating parts of my novel mechanism.

Referring particularly to Fig. 2, H represents the mechanism housing of any suitable projector mechanism. As is customary, the housing H comprises a center wall W which divides said housing into a pair of side-by-side compartments in one of which the projection lens P is adjustably supported. Disposed above the lens compartment is a film magazine A in which is supported a roll of motion picture film. A lamp housing B associated in suitable manner with the projector mechanism contains a suitable source of light from which a projecting light beam is passed from left to right between the blades of the usual shutter device C, then through the picture aperture into the lens compartment, through the projection lens P and thence to the screen.

As shown in Fig. 1, there is supported, in suitable detachable manner, the usual plate D—film trap—which carries the various parts of the film trap assembly. As is well understood, the plate D supports a pair of spaced rotatable wheels $a$ which serve as a guiding means for the film F as the latter passes downwardly past the projection field which is designated by the aperture $b$ formed in the plate D, the latter also carrying a tubular member $c$ which serves as a channel for the projecting light beam which passes through the aperture $b$ in the direction of the arrow $d$, Fig. 1.

As illustrated, the housing H carries the aforesaid magazine A which receives the upper film roll from which the film passes downwardly and engages the roller $e$, the sprocket wheel $f$, and then passes through the assembly carried by the plate D. Thereafter, the film F passes partly around the sprocket wheel $g$ and then engages the sprocket wheel $h$ from which said film may pass either to the sound reproducing apparatus and then to the lower film magazine or directly to the lower film magazine.

In accordance with my invention, the hereinbefore described center wall W carries a bracket structure $I$ of the character shown in Fig. 6, for example. Preferably, although not necessarily, the bracket structure $I$ may be detachably secured to the wall W in any suitable manner as, for example, by screws $2$, Fig. 3, which extend through the parallel bracket sections $3, 3a$ and secure them in vertical position on said wall W. As illustrated in Fig. 6, the bracket $I$ comprises a horizontal section $4$ formed with an ear $4a$ having a vertical passage in which one end of a vertical spindle $5$ is disposed for free rotatable movement, collars $6$ being disposed, respectively, above and below the ear $4a$ and said collars being secured to said spindle $5$ in order to retain it in its intended position.

As illustrated in Figs. 3 and 6, the aforesaid bracket sections $3, 3a$ are provided with vertical bevelled surfaces as indicated at $3b$ to thereby form a dove-tailed passage which slidably receives the dove-tailed, vertical section $7a$ of an angle bracket $7$ having a horizontal section $7b$. As shown, this vertical bracket section $7a$ is formed with a vertical passage $7c$ which is interiorly threaded for the reception of the upper threaded section of the aforesaid spindle $5$.

Disposed on the upper surface of the horizontal bracket section $7b$ is a plate $8$ which has depending wing sections $8a$ adapted to closely engage the respective opposite edges $7d$ of the horizontal bracket section $7b$. Members $9$ suitably secured to the respective wing sections $8a$ are adapted to slidably retain the plate $8$ to the horizontal bracket section $7b$. As shown in Figs. 4, 5 and 8, the plate $8$ comprises a depending lug section $8b$ which extends into a channel $7e$ formed in the horizontal bracket section $7b$. The lug section $8b$ comprises a horizontal threaded passage $8c$ adapted to receive a screw $10$ swivelled in said bracket section $7b$.

In accordance with the invention, the above noted plate $8$ comprises an upstanding section $8d$ provided with a large passage $8e$ through which the barrel of the projection lens is adapted to freely extend in substantially a horizontal direction as hereinafter described. Above this large passage $8e$, the plate $8$ is provided with three smaller horizontal passages $8f, 8g$ and $8h$, these passages being disposed in parallel relation with respect to each other and extending in substantially a horizontal direction.

As clearly indicated in Fig. 3, the passages 8f and 8g have fixed therein the ends of the respective rods 11, 11a. Extending freely through the passage 8h is a spindle 12 which is provided at one end with a knob 12a and threaded at its other end as shown at 12b. Axial movement of the rod 12 is prevented in any suitable manner, as by the provision of the collars 14 which are fixed to said rod 12 in contact with opposite sides of the plate section 8d. As clearly appears, the rods 11, 11a and 12 are disposed in parallel relation with respect to each other and they extend in a horizontal direction or substantially so.

As appears from a consideration of Fig. 1, a tubular member 15 is disposed to the rear of the aforesaid plate section 8d. As shown in Fig. 9, this tubular member comprises an upstanding flange 15a provided with three horizontal passages 15b, 15c and 15d disposed in alinement, respectively, with passages 8f, 8g and 8h of said plate section 8d. The passages 15b and 15c receive the respective rods 11 and 11a in free slidable relation while the passage 15d is interiorly threaded for the reception of the threaded end of the rod 12. From the foregoing, it follows that the upstanding plate section 8d serves as a support for the tubular member 15 and, that, by manipulation of the knob 12a, said tubular member 15 may be adjusted toward and from the plate section 8d.

The tubular member 15 serves as a holder for the barrel of the projection lens P. Preferably, the holder is a split ring, opposite sections of which are flanged for the reception of a clamping screw whereby the projection lens barrel may be frictionally retained in said holder. As will be observed from the drawings, the holder 15 is longitudinally alined with respect to the passage 8e of the plate section 8d. The projection lens P is adapted to extend freely through said passage 8e and, as shown in Fig. 1, the diameter of this passage is sufficiently large to satisfy this purpose.

The holder 15 may have a light opaque, hollow cylinder 17 associated therewith, said cylinder 17 being telescopically related to the holder 15 in freely slidable relation. To this end, the rear end of the cylinder 17 may comprise a laterally extending flanged section 17a to which, at approximately diametrically opposite sides thereof, one ends of the respective rods 18 are fixed, each rod 18 being disposed outwardly of said cylinder. The holder 15 comprises lugs 15e, Fig. 1, disposed at opposite diametrical sides thereof, these lugs being provided with longitudinal passages for the free slidable reception of the respective rods 18. Disposed about each rod 18 is a helical spring 19, one end of each of which engages the flanged section 17a of the cylinder 17 and the other ends of which engage the respective lugs 15e. Accordingly, it results that the cylinder 17 is biased from right to left, Fig. 1.

As shown in Fig. 1, the aforesaid tubular member c serves as a stop surface against which the end of the cylinder 17 seats under the influence of the aforesaid springs 19. Inasmuch as the cylinder 17 is carried by and movable with the holder 15, it follows that the tubular member c should be adjustably mounted so that the position thereof may be changed in accordance with an adjustment which may be imparted to the holder 15 and cylinder 17. Any suitable arrangement may thus be utilized. As herein shown, although not necessarily, the tubular member c comprises a circular flanged section c1 provided with a plurality of passages c2 through which extend the respective shanks of the headed screws 20. These screws 20 are threaded into the plate 21 forming a part of the film trap assembly. As shown, the passages c2 are substantially larger in diameter than the shanks of the screws 20 and, therefore, said screws may be loosened and the tubular member c moved to a desired adjusted position. Thereafter, said screws 20 may be tightened to positively retain the tubular member c in the desired position.

As clearly appears from a consideration of Figs. 1, 4 and 6, each of the aforesaid bracket sections 3, 3a comprise an ear 3c, these ears being provided with alined passages adapted to receive a spindle 22 having an operating head 22a at one end thereof. This spindle 22 is restrained from axial movement in any suitable manner but is freely rotatable in its supporting ears 3c. Carried by said spindle 22 is a worm gear 23 which meshes with a worm wheel 24 mounted on the aforesaid spindle 5, Fig. 5.

As herein shown, the forward end of the projection lens P extends through and beyond the front wall of the mechanism housing H. Furthermore, as shown although not necessarily, the operating ends of the spindles 12 and 22 extend beyond and terminate in front of said front wall of the mechanism housing H.

With the apparatus positioned as shown in Fig. 1, rotation imparted to the spindle 12 serves to move the holder 15 axially either toward or from the film trap assembly depending upon the direction of rotation of said spindle 12. During such axial movement, the holder 15 slides readily along the rods 11, 11a. The projection lens P is carried by said holder 15 and, therefore, the described movement thereof under the control of the spindle 12 serves to focus the images projected by said projection lens.

When the usual side door of the mechanism housing H is opened, a suitable tool may be utilized to rotate the above described screw 10 in one direction or the other. When the screw 10 is thus rotated, the plate 8 is moved horizontally on the horizontal section 7d of the bracket 7. In the manner described above, the plate 8 carries the barrel 15 and the projection lens P. Accordingly, in response to such horizontal movement of the plate 8, the projection lens P may be moved transversely of its longitudinal axis in a horizontal direction to thereby register the projected image area on the screen in case such image area should be displaced with respect to either vertical side of the screen.

Rotation imparted to the spindle 22 produces corresponding rotation of the vertical spindle 5. When the spindle 5 is thus rotated, the bracket 7 is moved either upwardly or downwardly depending upon the direction of spindle rotation. In this manner, the projection lens P may be moved transversely of its longitudinal axis in a vertical direction to thereby register the projected image area on the screen in the event that said image area is displaced with respect to either the top or bottom edge of the screen.

To effect the focusing operation, the projection lens P and its barrel 15 are moved in an axial direction as stated above. During such movement, the hereinbefore described cylinder 17 remains stationary with the rear end thereof in engagement with the tubular member c. When the projection lens P is moved transversely of its longitudinal axis in either a vertical or horizontal direction as described above, the screws 20 may be loosened to permit the tubular member c to take a position corresponding with the adjusted position of said projection lens. Thereafter, the screws 20 may be tightened to positively secure the tubular member c in its adjusted position.

From the foregoing, it will be obvious that my novel arrangement as disclosed herein is of simple character highly adapted for convenient and efficient operation. The provision of the described screw and spindle members 10, 12 and 22 enables the position of the projection lens to be selected with precision and nicety whereby the projection operation may be effected in a satisfactory manner.

Although the spindles 12 and 22 have been shown as extending to the exterior of the mechanism housing H, it shall be understood that the invention is not to be so limited. As well, if desired, these spindles may terminate interiorly of said mechanism housing.

While the invention has been described with respect to a certain particular example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. The combination with the vertical wall dividing a projector mechanism housing into compartments, of vertical guiding means, a bracket adjustable along said guiding means, means carried by the horizontal section of said bracket for supporting a projection lens, and manually operable screw-threaded means for adjusting said bracket in either of opposite vertical directions along said guiding means.

2. The combination with the vertical wall dividing a projector mechanism housing into compartments, of vertical guiding means, a bracket adjustable along said guiding means, means carried by the horizontal section of said bracket for supporting a projection lens, and manually operable screw-threaded means for adjusting said bracket in either of opposite vertical directions along said guiding means, said last named means comprising a threaded spindle disposed interiorly of said mechanism housing.

3. The combination with the vertical wall dividing a projector mechanism housing into compartments, of vertical guiding means carried by said vertical wall, a bracket adjustable along said guiding means, means carried by the horizontal section of said bracket for supporting a projection lens, a vertical spindle threaded to said bracket, and means for operating said spindle.

4. The combination with the vertical wall dividing a projector mechanism housing into compartments, of vertical guiding means carried by said vertical wall, a bracket adjustable along said guiding means, means carried by the horizontal section of said bracket for supporting a projection lens, a vertical spindle threaded to said bracket, and means for operating said spindle, said last named means comprising a second spindle disposed in driving relation with respect to said first named spindle.

5. In combination, a bracket having a horizontal section, a plate section upstanding therefrom, horizontal guiding means carried by said plate section, a tubular member slidable on said guiding means and adapted to serve as a holder for a projection lens, and means for imparting axial movement to said tubular member along said guiding means.

6. In combination, a bracket having a horizontal section, a plate section upstanding therefrom, a pair of parallel rods fixed to said plate section and extending in substantially a horizontal direction, a tubular member slidable on said rods and adapted to serve as a holder for a projection lens, and means for imparting axial movement to said tubular member along said rods.

7. In combination, a bracket having a horizontal section, a plate section upstanding therefrom, a pair of parallel rods fixed to said plate section and extending in substantially a horizontal direction, a tubular member slidable on said rods and adapted to serve as a holder for a projection lens, and means for imparting axial movement to said tubular member along said rods, said means comprising a threaded spindle fixed to said plate section and coacting with said holder.

8. In combination, a support for a projection lens, a cylindrical member alined with said projection lens, a tubular member alined with said cylindrical member and having the end thereof seating thereagainst, a support for said tubular member, means for adjusting said projection lens in a direction laterally of the longitudinal axis thereof, and means for adjusting said tubular member in a direction corresponding with the adjusted direction of movement of said projection lens.

9. In combination, a support for a projection lens, a cylindrical member alined with said projection lens, a tubular member alined with said cylindrical member and having the end thereof seating thereagainst, a support for said tubular member, means for adjusting said projection lens either vertically or horizontally in a lateral direction with respect to the longitudinal axis thereof, and means for adjusting said tubular member in a direction corresponding with the adjusted direction of movement of said projection lens.

10. The combination with the vertical wall dividing a projector mechanism housing into compartments, of vertical guiding means, a bracket adjustable along said guiding means, means carried by the horizontal section of said bracket for supporting a projection lens, manually operable screw-threaded means for adjusting said bracket in either of opposite vertical directions along said guiding means, and screw-threaded means for imparting axial movement to said projection lens.

11. The combination with the vertical wall dividing a projector mechanism housing into compartments, of vertical guiding means, a bracket adjustable along said guiding means, means carried by the horizontal section of said bracket for supporting a projection lens, manually operable screw-threaded means for adjusting said bracket in either of opposite vertical directions along said guiding means, screw-threaded means for imparting axial movement to said projection lens, and screw-threaded means for imparting horizontal movement to said projection lens laterally of the longitudinal axis thereof.

DAVID F. NEWMAN.